US012722627B2

(12) United States Patent
Kamoshita

(10) Patent No.: US 12,722,627 B2
(45) Date of Patent: Sep. 1, 2026

(54) TRAVEL CONTROL SYSTEM, TRAVEL CONTROL DEVICE, TRAVEL CONTROL METHOD, AND STORAGE MEDIUM

(71) Applicant: DENSO CORPORATION, Kariya-city (JP)

(72) Inventor: Yuta Kamoshita, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 249 days.

(21) Appl. No.: 18/403,348

(22) Filed: Jan. 3, 2024

(65) Prior Publication Data

US 2024/0132061 A1 Apr. 25, 2024
US 2024/0227789 A9 Jul. 11, 2024

Related U.S. Application Data

(63) Continuation of application No. PCT/JP2022/023792, filed on Jun. 14, 2022.

(30) Foreign Application Priority Data

Jul. 5, 2021 (JP) ................................ 2021-111688

(51) Int. Cl.
*B60W 30/09* (2012.01)
*G08G 1/16* (2006.01)

(52) U.S. Cl.
CPC ............ *B60W 30/09* (2013.01); *G08G 1/162* (2013.01); *B60W 2554/4045* (2020.02); *B60W 2720/10* (2013.01)

(58) Field of Classification Search
CPC ......... B60W 30/09; B60W 2554/4045; B60W 2720/10; B60W 30/0956; B60W 40/04; B60W 60/0027; G08G 1/162; G08G 1/16
See application file for complete search history.

(56) References Cited

U.S. PATENT DOCUMENTS

2014/0081476 A1* 3/2014 Verdugo-Lara ...... B62D 15/027 701/1
2016/0148514 A1* 5/2016 Iwami .................... G08G 1/168 340/932.2
2017/0144654 A1* 5/2017 Sham ..................... G08G 1/148
2019/0122558 A1 4/2019 Matsunaga et al.
2020/0410853 A1 12/2020 Akella et al.
2021/0354686 A1* 11/2021 Pan ......................... G01S 15/08

FOREIGN PATENT DOCUMENTS

JP 2012-221451 A 11/2012

* cited by examiner

*Primary Examiner* — Jason Holloway
(74) *Attorney, Agent, or Firm* — Precision Patents, P.C.

(57) ABSTRACT

A travel control system includes a processor, and controls travel of a host vehicle. The processor is configured to detect a move-related behavior indicating move of a target vehicle to a space connected to a travel path of a host vehicle, when the target vehicle is traveling from a travel direction side of the host vehicle toward an existence direction side of the host vehicle. The processor is configured to perform, when detecting the move-related behavior, an admission control to admit move of the target vehicle to the space. The admission control includes stopping the traveling host vehicle with an admission distance being reserved for admitting move of the target vehicle to the space.

9 Claims, 5 Drawing Sheets

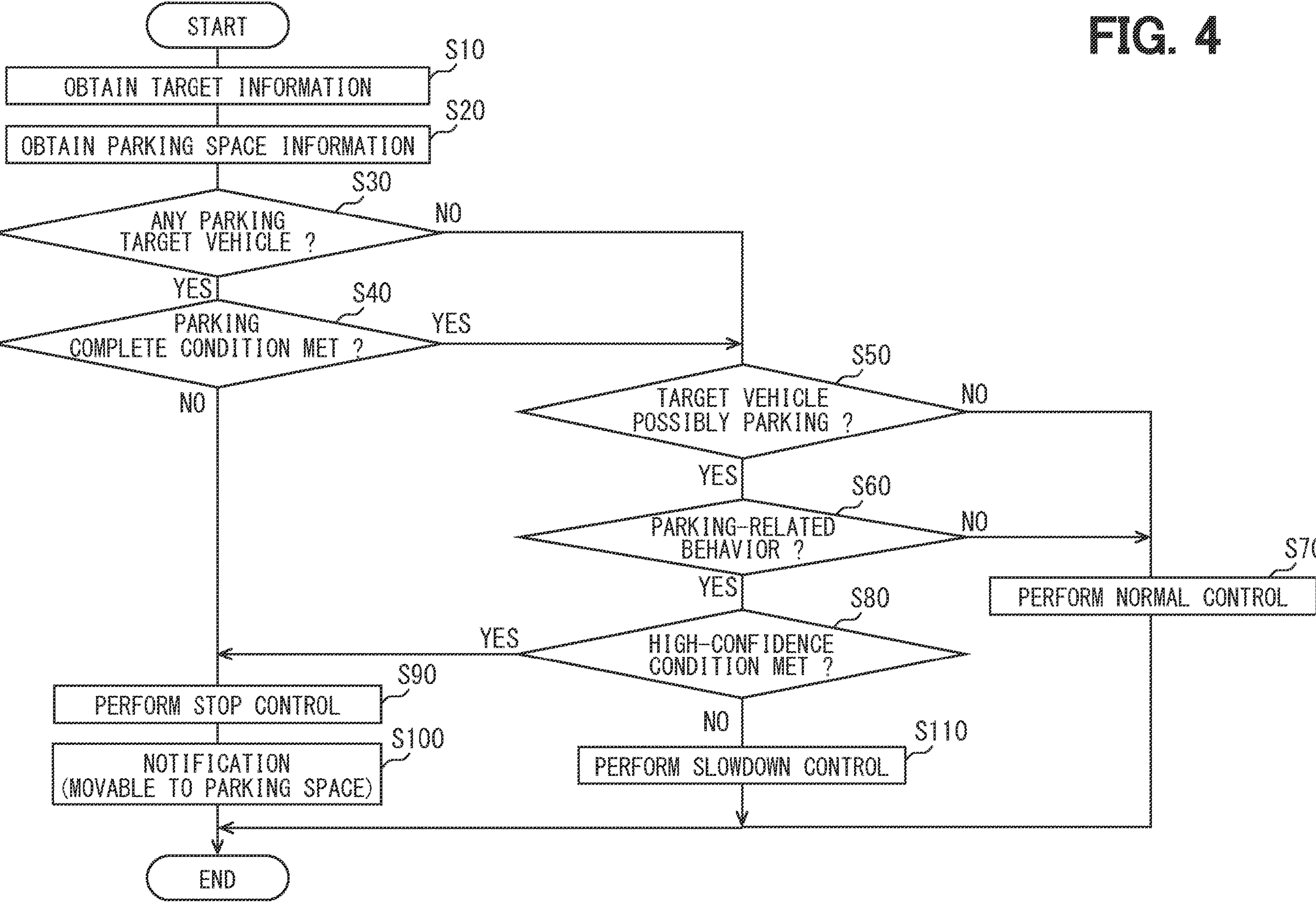
FIG. 4
START
OBTAIN TARGET INFORMATION
S10
OBTAIN PARKING SPACE INFORMATION
S20
ANY PARKING TARGET VEHICLE ?
S30
NO
YES
PARKING COMPLETE CONDITION MET ?
S40
YES
NO
TARGET VEHICLE POSSIBLY PARKING ?
S50
NO
YES
PARKING-RELATED BEHAVIOR ?
S60
NO
YES
PERFORM NORMAL CONTROL
S70
HIGH-CONFIDENCE CONDITION MET ?
S80
YES
NO
PERFORM STOP CONTROL
S90
NOTIFICATION (MOVABLE TO PARKING SPACE)
S100
PERFORM SLOWDOWN CONTROL
S110
END

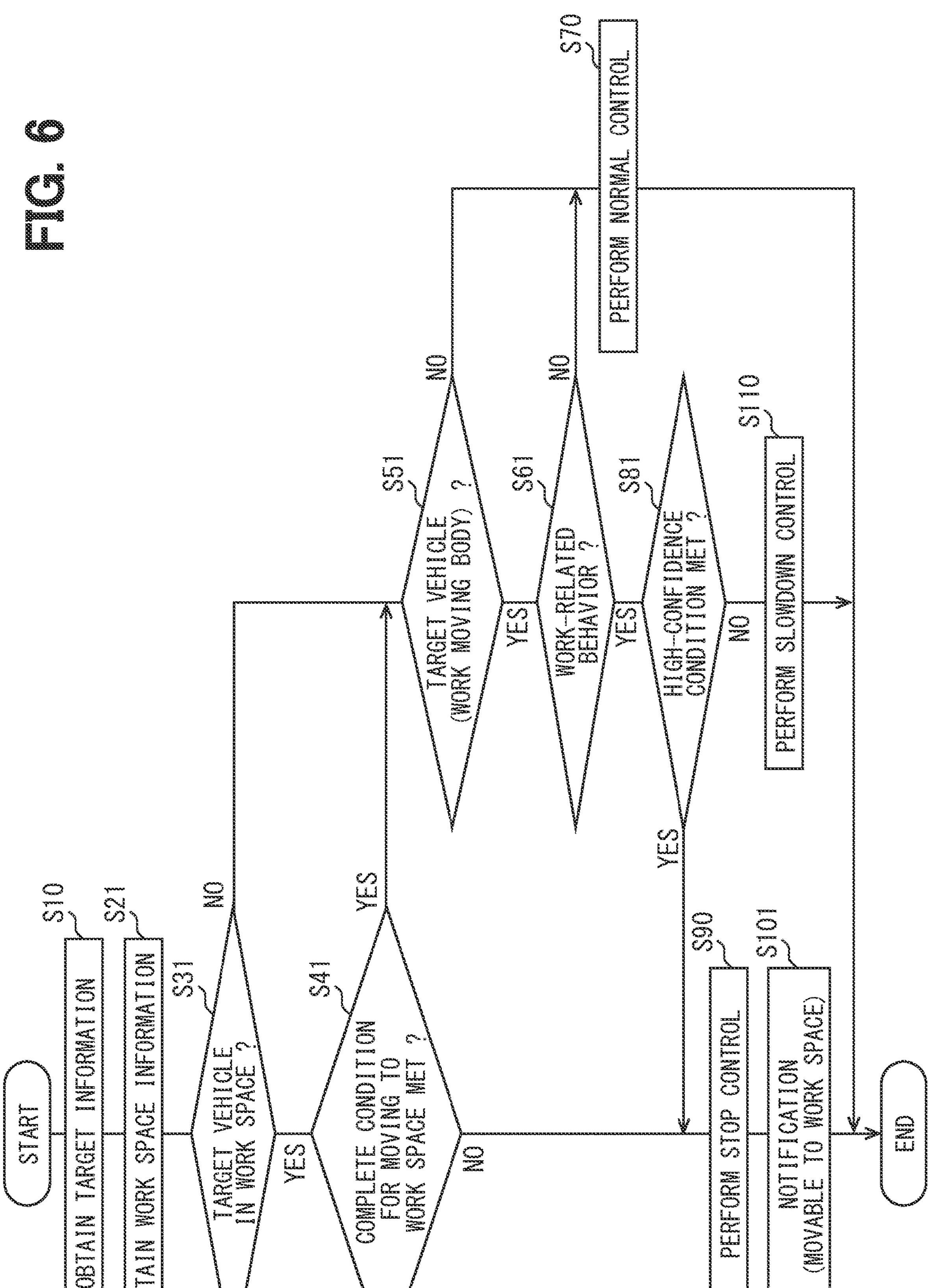
FIG. 6
START
OBTAIN TARGET INFORMATION
S10
OBTAIN WORK SPACE INFORMATION
S21
TARGET VEHICLE IN WORK SPACE ?
S31
YES
NO
COMPLETE CONDITION FOR MOVING TO WORK SPACE MET ?
S41
YES
NO
TARGET VEHICLE (WORK MOVING BODY) ?
S51
YES
NO
WORK-RELATED BEHAVIOR ?
S61
YES
NO
HIGH-CONFIDENCE CONDITION MET ?
S81
YES
NO
PERFORM NORMAL CONTROL
S70
PERFORM SLOWDOWN CONTROL
S110
PERFORM STOP CONTROL
S90
NOTIFICATION (MOVABLE TO WORK SPACE)
S101
END

TRAVEL CONTROL SYSTEM, TRAVEL CONTROL DEVICE, TRAVEL CONTROL METHOD, AND STORAGE MEDIUM

CROSS REFERENCE TO RELATED APPLICATIONS

The present application is a continuation application of International Patent Application No. PCT/JP2022/023792 filed on Jun. 14, 2022, which designated the U.S. and claims the benefit of priority from Japanese Patent Application No. 2021-111688 filed on Jul. 5, 2021. The entire disclosures of all of the above applications are incorporated herein by reference.

TECHNICAL FIELD

The present disclosure relates to travel control technology for controlling travel of a host moving body.

BACKGROUND

A relevant art discloses a technology for controlling move of an own vehicle to admit another vehicle to pass through or overtake when the own vehicle blocks a course of another vehicle. However, such move of the own vehicle may newly create a risk of approaching or close encounter between the own vehicle and surrounding vehicles.

SUMMARY

A travel control system, which controls travel of a host moving body, includes a processor configured to: detect a move-related behavior indicating a move of a target moving body to a space connected to a travel path of the host moving body, the target moving body traveling from a far side toward a near side in a travel direction of the host moving body; and perform, when detecting the move-related behavior, an admission control to admit the move of the target moving body to the space. The admission control includes stopping the host moving body, which is in a traveling state, with an admission distance being reserved for admitting the move of the target moving body to the space.

BRIEF DESCRIPTION OF DRAWINGS

Objects, features, and advantages of the present disclosure will become more apparent from the following detailed description made with reference to the accompanying drawings, in which:

FIG. 4 is a flowchart of a travel control method according to the first embodiment;

FIG. 6 is a flowchart of a travel control method according to the second embodiment.

DETAILED DESCRIPTION

Figure 1:
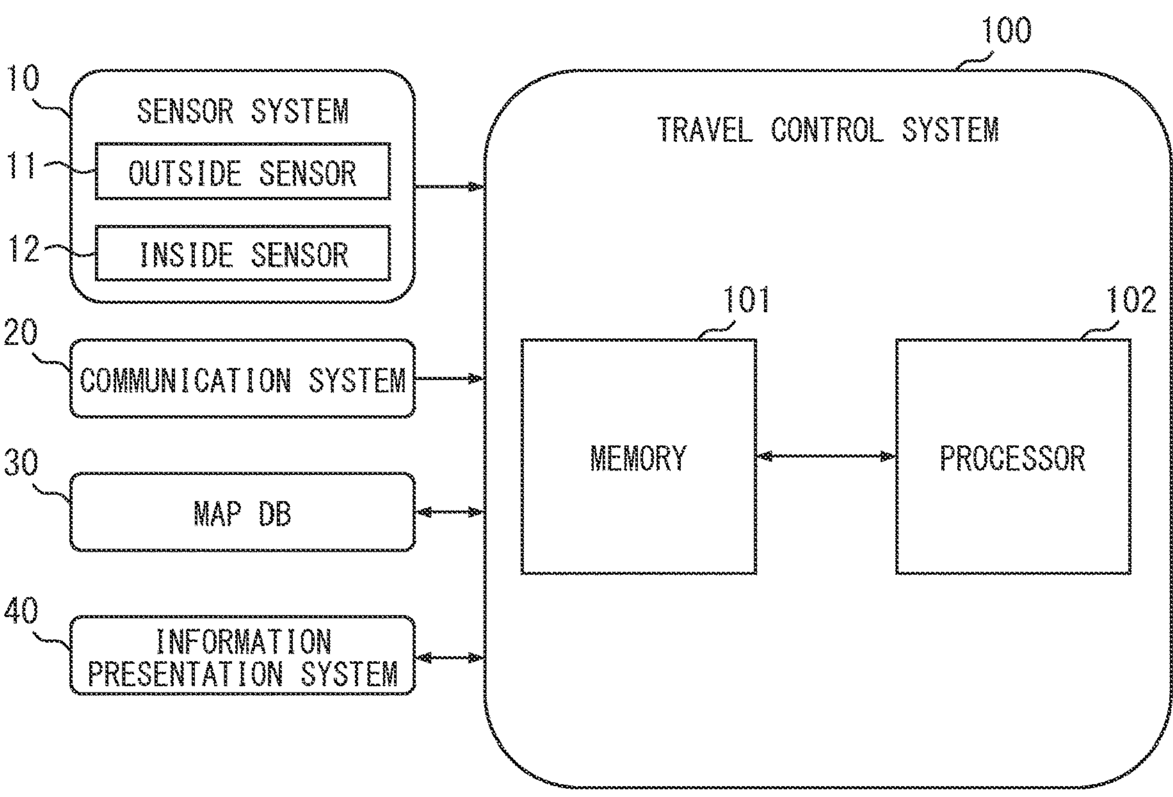
FIG. 1 is a block diagram of an overall configuration according to a first embodiment.

A relevant art discloses a technology for controlling an own vehicle to admit another vehicle to pass through when the own vehicle blocks a course of another vehicle. In this technology, a travel control device determines whether an external object that is moving from one adjacent lane of an own vehicle lane in which the own vehicle is traveling to the other adjacent lane can actually move across the own vehicle lane in view of the presence of the own vehicle. When determining that the external object cannot move across the own vehicle lane due to the presence of the own vehicle, the travel control device moves the own vehicle to reserve a crossing space for the external object to move across the own vehicle lane.

In the technique of the relevant art, the own vehicle is moved from a state in which the own vehicle blocks the course of another vehicle. However, such move of the own vehicle may newly create a risk of approaching between the own vehicle and surrounding vehicles.

A first aspect of the present disclosure is a travel control system, which controls travel of a host moving body. The travel control system includes a processor, which, by executing a program stored in a computer-readable non-transitory tangible storage medium, is configured to: detect a move-related behavior indicating a move of a target moving body to a space connected to a travel path of the host moving body, the target moving body traveling from a far side toward a near side in a travel direction of the host moving body; and perform, when detecting the move-related behavior, an admission control to admit the move of the target moving body to the space. The admission control includes stopping the host moving body, which is in a traveling state, with an admission distance being reserved for admitting the move of the target moving body to the space.

A second aspect of the present disclosure is a travel control device, which controls travel of a host moving body. The travel control device includes a processor, which, by executing a program stored in a computer-readable non-transitory tangible storage medium, configured to: detect a move-related behavior indicating a move of a target moving body to a space connected to a travel path of the host moving body, the target moving body traveling from a far side toward a near side in a travel direction of the host moving body; and perform, when detecting the move-related behavior, an admission control to admit the move of the target moving body to the space. The admission control includes stopping the host moving body, which is in a traveling state, with an admission distance being reserved for admitting the move of the target moving body to the space.

A third aspect of the present disclosure is a travel control method performed by a processor for controlling travel of a host moving body. The travel control method includes: detecting a move-related behavior indicating a move of a target moving body to a space connected to a travel path of the host moving body, the target moving body traveling from a far side toward a near side in a travel direction of the host moving body; and performing, when detecting the move-related behavior, an admission control to admit the move of the target moving body to the space. The admission control includes stopping the host moving body, which is in a traveling state, with an admission distance being reserved for admitting the move of the target moving body to the space.

A fourth aspect of the present disclosure is a travel control program stored in a computer-readable non-transitory tangible storage medium. The travel control program includes instructions to be executed by a processor for controlling traveling of a host moving body. The instructions of travel control program includes: detection of a move-related behavior indicating a move of a target moving body to a space connected to a travel path of the host moving body, the target moving body traveling from a far side toward a near side in a travel direction of the host moving body; and execution of an admission control to admit the move of the target moving body to the space when detecting the move-related behavior. The admission control includes stopping the host moving body, which is in a traveling state, with an admission distance being reserved for admitting the move of the target moving body to the space.

According to these first to fourth aspects, when the move-related behavior of the target moving body is detected, the host moving body in traveling state can stop traveling, in advance, in a state of reserving the admission distance. Therefore, before the host moving body obstructs the move of the target moving body to the space, the host moving body can stop, in advance, in a state of pre-admitting the move of the target moving body. Therefore, it is no longer necessary to cause the move of the host moving body in a state of obstructing the move of the target moving body, and a risk of approaching the surrounding moving body can be reduced. That is, with the above-described travel control system, travel control device, travel control method, and the travel control program, it is capable of avoiding risk of approaching surrounding moving bodies.

Hereinafter, embodiments of the present disclosure will be described with reference to the drawings. It should be noted that the same reference numerals are assigned to corresponding components in the respective embodiments, and redundant description may be omitted. Moreover, when only a part of the configuration is described in each embodiment, the configurations of the previously-described other embodiments can be applied to the other portions of the configuration. Further, not only allowing the combinations of the configurations explicitly shown in the description of the respective embodiments, but also the configurations of multiple embodiments can be partially combined without explicitly showing, if there is no difficulty in such combinations in particular.

First Embodiment

Figure 2:
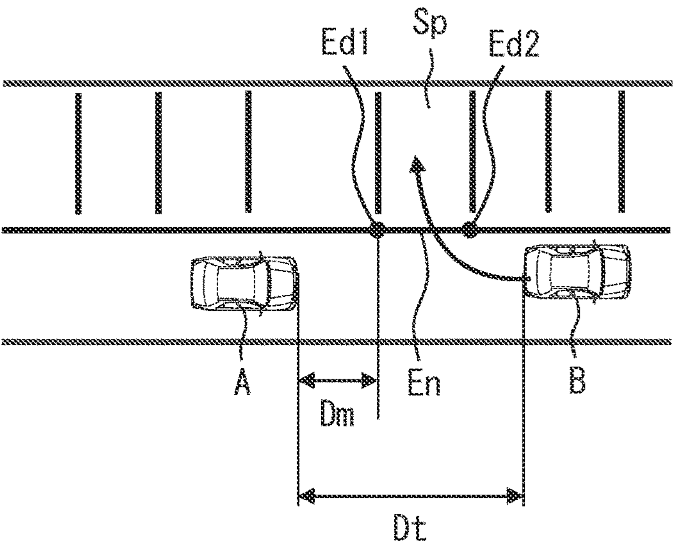
FIG. 2 is a schematic diagram of a travel environment of a host vehicle to which the first embodiment is applied.

A travel control system 100 of the first embodiment shown in FIG. 1 controls travel of a host vehicle A shown in FIG. 2. From a viewpoint centered on the host vehicle A, the host vehicle A may also be defined as an ego-vehicle. From the viewpoint centered on the host vehicle A, a target vehicle B can also be designated as an other road user.

The host vehicle A is an example of a "host moving body," and the target vehicle B is an example of a "target moving body."

The host vehicle A is provided with an automatic driving mode having levels according to a degree of manual intervention of an occupant in the driving task. The automatic driving mode may be realized with an autonomous drive control, such as conditional driving automation, advanced driving automation, or full driving automation, where the system in operation performs all driving tasks. The automatic driving mode may be realized with an advanced driving assistance control, such as driving assistance or partial driving automation, where an occupant performs some or all driving tasks. The automatic driving mode may be realized by either one or combination of automatic drive control and advanced driving assistance control or switching therebetween.

The host vehicle A is equipped with a sensor system 10, a communication system 20, and a map database (hereinafter referred to as "DB") 30 shown in FIG. 3. The sensor system 10 obtains sensor information that can be used by the travel control system 100 by detecting an outside and inside of the host vehicle A. For such purposes, the sensor system 10 includes an outside sensor 11 and an inside sensor 12.

Figure 3:
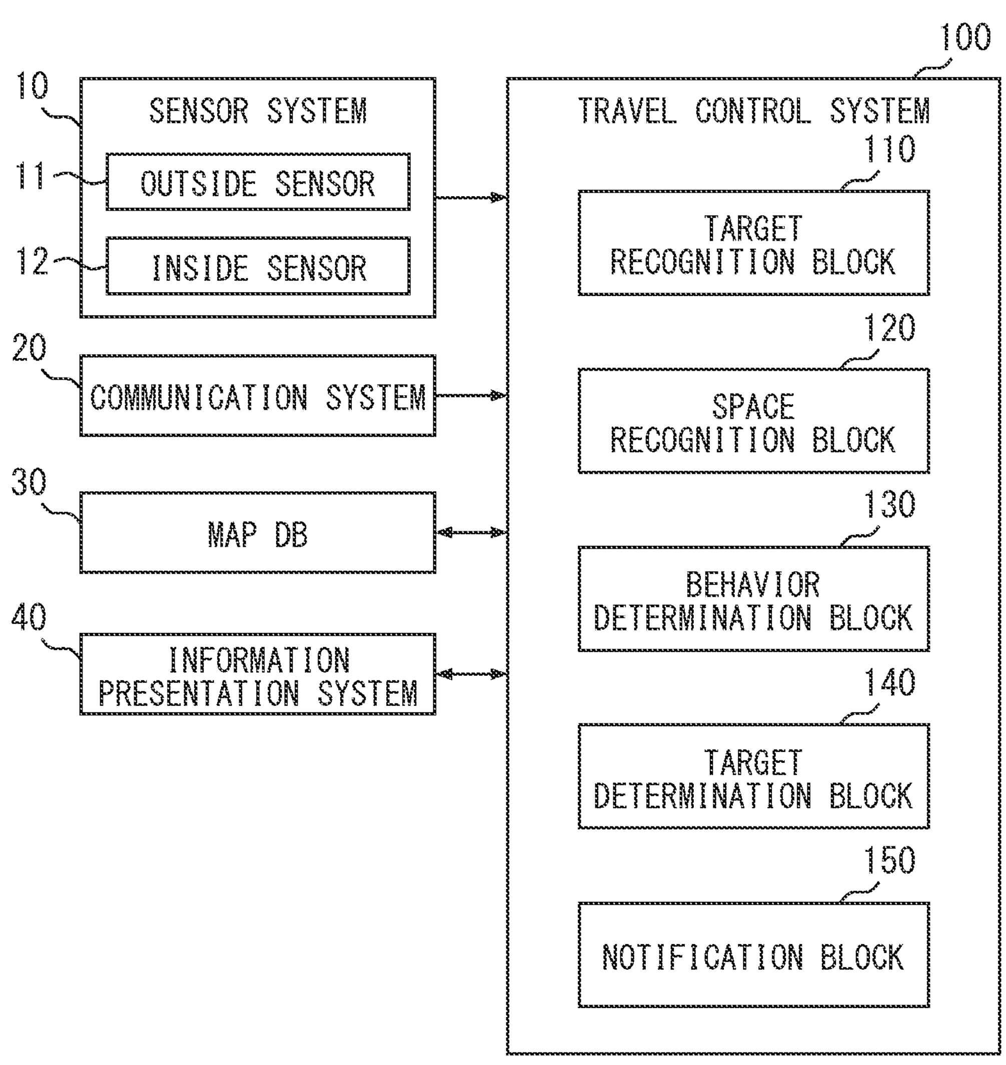
FIG. 3 is a block diagram of a functional configuration of a travel control system according to the first embodiment.

The host vehicle A is equipped with the sensor system 10, an information presentation system 40, and the map DB 30 shown in FIG. 3.

The outside sensor 11 obtains outside information that can be used by the travel control system 100 from the outside that is the surrounding environment of the host vehicle A. The outside sensor 11 may obtain the outside information by detecting a target object disposed in the outside of the host vehicle A. The target object detection type outside sensor 11 is, for example, at least one type of camera, LiDAR (Light Detection and Ranging/Laser Imaging Detection and Ranging), radar, sonar, and the like.

The inside sensor 12 obtains inside information that can be used by the travel control system 100 from the inside, which is an inside of the host vehicle A. The inside sensor 12 may obtain the inside information by detecting a specific kinetic physical quantity in an inside of the host vehicle A. The kinetic physical quantity detection type inside sensor 12 is at least one type of, for example, a travel speed sensor, an acceleration sensor, a gyro sensor, and the like. The inside sensor 12 may obtain the inside information by detecting a specific state of an occupant in the inside of the host vehicle A. The occupant detection type inside sensor 12 is at least one of, for example, a driver status monitor (registered trademark), a biosensor, a seating sensor, an actuator sensor, an in-vehicle equipment sensor, and the like.

The communication system 20 obtains communication information that can be used by the travel control system 100 by wireless communication. The communication system 20 may receive a positioning signal from an artificial satellite of a global navigation satellite system (i.e., GNSS) existing in the outside of the host vehicle A. The positioning type communication system 20 is, for example, a GNSS receiver or the like. The communication system 20 may transmit and receive communication signals with a V2X system existing in the outside of the host vehicle A. The V2X type communication system 20 is at least one type of, for example, a dedicated short range communication (i.e., DSRC) device, a cellular V2X (i.e., C-V2X) communication device, and the like. The communication system 20 may transmit and receive communication signals to and from a terminal existing in the inside of the host vehicle A. The terminal communication type communication system 20 is, for example, at least one of Bluetooth (registered trademark) equipment, Wi-Fi (registered trademark) equipment, infrared communication equipment, and the like.

The map DB 30 stores map information that can be used by the travel control system 100. The map DB 30 includes at least one type of non-transitory, tangible storage medium of, for example, a semiconductor memory, a magnetic medium, an optical medium, and the like. The map DB 30 may be a database of a locator for estimating a self-state quantity of the host vehicle A including a position of the host vehicle A. The map DB 30 may be a database of a navigation unit that navigates a travel route of the host vehicle A. The map DB 30 may be made up as a combination of such databases and the like.

For example, the map DB 30 obtains and stores the latest map information through communication with an external center via the communication system 20 of the V2X type. The map information is a two- or three-dimensional data indicating a travel environment of the host vehicle A as the information. Digital data of a high definition map may be adopted as the three-dimensional map data. The map information may include road information representing at least one of the position, shape, road surface condition, and the like of the road itself, for example. The map information may include traffic sign information representing the position and shape of at least one of traffic signs and lane markings attached to roads, for example. The map information may include, for example, structure information representing the positions and shapes of at least one of buildings and traffic lights facing roads.

The information presentation system 40 presents notification information to a notification target. The information presentation system 40 presents notification information to occupants in the host vehicle A, for example. The in-vehicle presentation type information presentation system 40 may be a visual sense presentation unit that presents the notification information by stimulating a visual sense of a notification target. The visual sense presentation unit is at least one type of, for example, a head-up display (HUD), a multi function display (MFD), a combination meter, a navigation unit, a light emitting unit, and the like. The in-vehicle presentation type information presentation system 40 may also be an auditory sense presentation unit that presents the notification information by stimulating an auditory sense of a notification target. The auditory sense presentation unit is at least one type of, for example, a speaker, a buzzer, a vibration unit, and the like. The information presentation system 40 may also be a tactile sense presentation unit that presents the notification information by stimulating a skin sensation of a notification target. The skin sensation stimulated by the tactile sense presentation unit includes at least one of tactile sense, temperature sense, wind sense, and the like. The tactile sense presentation unit is at least one of, for example, a steering wheel vibration unit, a driver seat vibration unit, a steering wheel reaction force unit, an accelerator pedal reaction force unit, a brake pedal reaction force unit, and an air conditioning unit. be.

The information presentation system 40 may present the notification information to a person outside the host vehicle A. The outside of vehicle presentation type information presentation system 40 may be a visual sense presentation unit or an auditory sense presentation unit. The outside of vehicle presentation type visual sense presentation unit is at least one of an external display and a light emitting unit. The outside of vehicle presentation type auditory sense presentation unit is at least one of a speaker, a buzzer, and the like.

The travel control system 100 is connected to the sensor system 10, the communication system 20, the map DB 30, and the information presentation system 40 via at least one of a LAN (Local Area Network) line, a wire harness, an internal bus, a wireless communication line, and the like. The travel control system 100 includes at least one dedicated computer.

The dedicated computer that configures the travel control system 100 may also be an integrated ECU (Electronic Control Unit) that integrates a drive control of the host vehicle A. The dedicated computer that configures the travel control system 100 may also be a determination ECU that determines the driving task in the drive control of the host vehicle A. A dedicated computer that configures the travel control system 100 may also be a monitoring ECU that monitors the drive control of the host vehicle A. The dedicated computer that configures the travel control system 100 may also be an evaluation ECU that evaluates the drive control of the host vehicle A.

The dedicated computer that configures the travel control system 100 may also be a drive control ECU (Electronic Control Unit) that controls the drive of the host vehicle A. The dedicated computer that configures the travel control system 100 may also be a navigation ECU that navigates the travel route of the host vehicle A. The dedicated computer that configures the travel control system 100 may also be a locator ECU that estimates the host vehicle A's self-state quantity. The dedicated computer that configures the travel control system 100 may also be an actuator ECU that controls travel actuators of the host vehicle A. The dedicated computer that configures the travel control system 100 may also be an HCU (Human Machine Interface (HMI) Control Unit) that controls information presentation by the information presentation system 40 in the host vehicle A. The dedicated computer that configures the travel control system 100 may also be a computer in a position other than the host vehicle A that configures an external center or a moving body terminal communicable via the V2X type communication system 20, for example.

The dedicated computer that configures the travel control system 100 includes at least one memory 101 and at least one processor 102. The memory 101 is at least one type of non-transitory, tangible storage medium, such as a semiconductor memory, a magnetic medium, and an optical medium, for storing, in a non-transitory manner, computer readable programs and data. The processor 102 includes at least one type of, for example, a CPU (i.e., Central Processing Unit), a GPU (i.e., Graphics Processing Unit), a RISC (i.e., Reduced Instruction Set Computer)-CPU, a DFP (i.e., Data Flow Processor), a GSP (i.e., Graph Streaming Processor), or the like as a core.

In the travel control system 100, the processor 102 performs multiple instructions contained in a travel control program stored in the memory 101 to control the travel of the host vehicle A. As a result, the travel control system 100 constructs multiple functional blocks for controlling travel of the host vehicle A. The functional blocks constructed in the travel control system 100 include a target recognition block 110, a space recognition block 120, a behavior determination block 130, a target determination block 140, and a notification block 150 as shown in FIG. 3.

The target recognition block 110 obtains target information about the target vehicle B reversely traveling from a far side toward a near side in a travel direction of the host vehicle. The target vehicle B traveling from a far side toward a near side in a travel direction of the host vehicle, for example, includes a vehicle reversely traveling in a current lane of the host vehicle A, which is currently traveled by the host vehicle A or in other lane having a same travel direction as the current lane. In the following description, the current lane and lanes having the same travel direction as the current lane may be collectively referred to as same direction lanes. In addition, the target vehicle B traveling from a far side of the host vehicle A toward a near side of the host vehicle A includes, for example, a vehicle oncoming toward the host vehicle A in an oncoming lane of the current lane. The above-described target vehicle B is a target vehicle B that has a possibility of being parked.

The target recognition block 110 may obtain the target information included in the outside information from the outside sensor 11. Alternatively, the target recognition block 110 may obtain the target information included in the communication information from the V2X type communication system 20. The target information includes information about a behavior of the target vehicle B. For example, the target information may include at least one of a position, a speed, and a travel direction of the target vehicle B. Furthermore, the target information may include at least one of information regarding whether or not a blinker of the target vehicle B is lit, information regarding whether or not a hazard lamp of the target vehicle B is lit, and information regarding whether or not a reverse lamp of the target vehicle B is lit.

The space recognition block 120 obtains parking space information for a parking space Sp connected to a travel path of the host vehicle A. The space recognition block 120 may obtain the parking space information included in the map data stored in the map DB 30. The parking space information may include at least one of a position and a range of the parking space Sp, and a position of an entrance En to the parking space Sp from a roadway. The parking space Sp is an example of a "space."

The behavior determination block 130 determines whether or not the target vehicle B is taking a parking-related behavior related to parking in the parking space Sp, based on the target information and the parking space information. The behavior determination block 130 determines that a parking-related behavior is taken when, for example, a distance between the target vehicle B and the parking space Sp is within a parking distance range and a vehicle speed of the target vehicle B is within a parking speed range. The parking distance range is a range in which the distance between the target vehicle B and the parking space Sp is (a) equal to or less than a distance threshold or (b) less than the distance threshold. The parking speed range is a range in which the vehicle speed of the target vehicle B is (a) equal to or less than a vehicle speed threshold or (b) less than the vehicle speed threshold.

Further, the parking-related behavior includes a high confidence behavior and a low confidence behavior. The high confidence behavior is a behavior in which a probability that parking in the parking space Sp is realized is higher than a low confidence behavior. The low confidence behavior is a behavior in which a probability that parking in the parking space Sp is realized is lower than the high confidence behavior. The behavior determination block 130 further determines whether the parking-related behavior taken by the target vehicle B of determination corresponds to the high confidence behavior or the low confidence behavior. For example, the behavior determination block 130 determines that the parking-related behavior corresponds to the high confidence behavior when a high-confidence condition is met, and determines that the parking-related behavior corresponds to the low confidence behavior when the high-confidence condition is not met.

Specifically, the high-confidence condition includes that the target vehicle B traveling in the same direction lane is reversely traveling the same direction. Further, the high-confidence condition includes that the hazard lamp or the reverse lamp of the target vehicle B traveling in the same direction lane is in a lit state. In addition, the high-confidence condition includes that the blinker on a parking space Sp side of the target vehicle B traveling in the oncoming lane is in a lit state. Further, the high-confidence condition includes that the target vehicle B is determined to have the parking space Sp as its destination based on the information obtained from the communication system 20. In addition, the high-confidence condition includes that the target vehicle B is estimated to have the parking space Sp as its destination from the gestures, facial orientation, etc. of the occupant of the target vehicle B. The high-confidence condition may be determined to be met when at least one of the above detailed conditions is met. It should be noted that the high-confidence condition may be determined to be met when a specified combination of the detailed conditions among the above-described detailed conditions are all met.

The above-described parking-related behavior is an example of the move-related behavior related to move of the host vehicle A to the space connected to the travel path.

In addition, the behavior determination block 130 determines whether or not the target vehicle B that has reached the parking space Sp meets a parking complete condition that the parking is complete. For example, the parking complete condition includes that a stop time of the target vehicle B within the parking space Sp reaches a completion time range. The completion time range is a time range in which the stop time is (a) equal to or longer than a threshold time or (b) longer than the threshold time. Alternatively, the parking complete condition may include that an elapsed time from passage of the entrance En to the parking space Sp by the target vehicle B reaches the completion time range.

The target determination block 140 determines the target behavior of the host vehicle A based on the parking-related behavior determined by the behavior determination block 130. The target determination block 140 determines a travel control (i.e., a normal control) of the host vehicle A at a normal target inter-vehicle distance and at a target speed when it is determined that the target vehicle B is not taking the parking-related behavior.

On the other hand, when it is determined that the target vehicle B is taking the parking-related behavior, the target determination block 140 determines that an admission control of the host vehicle A is performed for admitting the target vehicle B to move to the parking space Sp. The target determination block 140 performs different admission controls depending on whether the parking-related behavior corresponds to the low confidence behavior or the high confidence behavior. Here, performing the admission control may include, for example, outputting an instruction for realizing a target vehicle speed and a target inter-vehicle distance to a drive system of the host vehicle A.

Specifically, when the parking-related behavior is determined to be a low confidence behavior, the target determination block 140 performs a slowdown control in which the host vehicle A travels while the target speed is reduced to be within an admissible speed range. The admissible speed range is a speed range that is (a) less than an admissible speed threshold or (b) equal to or less than the admissible speed threshold. For example, the admissible speed range is set as a range of a speed at which at least a specified amount of time can be reserved from a start of slowdown before the distance to the target vehicle B reaching an admission distance Dt. The specified amount of time is a preset amount of time. For example, when the target vehicle B is in the same direction lane, the preset amount of time may be set as an assumed time from (i) when the vehicle stops to (ii) when the vehicle starts reverse parking. Further, for example, when the target vehicle B is in the oncoming lane, the specified amount of time is set as an assumed time until the target vehicle B starts to move across the current lane of the host vehicle A for entering the parking space Sp.

The target determination block 140 continues the above-described slowdown control until the high confidence behavior is established for the target vehicle B or until the parking-related behavior is interrupted.

Then, when the parking-related behavior is determined to correspond to the high confidence behavior, the target determination block 140 performs a stop control that causes the traveling host vehicle A to stop in a state which reserves the admission distance Dt for admitting the parking of the target vehicle B. For example, as shown in FIG. 2, the admission distance Dt is determined based on a margin distance Dm, which is added to a far side end Ed1 farther than an end Ed2 from the target vehicle B toward the host vehicle A, when two ends Ed1 and Ed2 are observed as both ends of the entrance En to the parking space Sp. The admission distance Dt is a target inter-vehicle distance between the host vehicle A and the target vehicle B when the host vehicle A and the target vehicle B are in the same lane. Alternatively, when the host vehicle A and the target vehicle B are not in the same lane, the admission distance Dt is (A) a target distance between a position of the host vehicle A and a position of the target vehicle B in an extension direction of the current lane or (B) simply a target distance from the host vehicle A to the target vehicle B.

Note that the margin distance Dm may be changed according to the shape and position of the parking space Sp, the size of the entrance En, and the like. For example, the margin distance Dm may be increased as the difficulty of parking is estimated to be higher based on the above-described parameters.

The target determination block 140 continues the stop control described above until the parking complete condition of parking for the target vehicle B is met. The target determination block 140 may resume the normal control when the parking complete condition is met and there is no other target vehicle B exhibiting the parking-related behavior. Alternatively, the target determination block 140 may resume the normal control even for the target vehicle B for which the parking complete condition is not met, when the parking-related behavior is interrupted due to, for example, a leave of the target vehicle B from the parking space Sp or the like.

The notification block 150 notifies the target vehicle B that parking in the parking space Sp is possible when performing the stop control for the target vehicle B taking the high confidence behavior. The notification block 150 may provide notification via the V2X type communication system 20. In the target vehicle B that has received the notification via the communication system 20, the in-vehicle presentation type information presentation system may present to the occupant that parking in the parking space Sp is possible. Alternatively, when the target vehicle B that has obtained the notification via the communication system 20 is an automatic driving vehicle, a vehicle control for parking may be permitted based on the notification. Alternatively, the notification block 150 may provide the notification via the outside of vehicle presentation type information presentation system 40.

A flow of a travel control method (hereinafter referred to as a travel control flow) for controlling the travel of the host vehicle A by the travel control system 100 by the cooperation of the blocks 110, 120, 130, 140, and 150 described so far will be described in the following with reference to FIG. 4. This processing flow is repeatedly performed while the host vehicle A is activated. Note that "S" in this processing flow means each of multiple steps performed by multiple instructions included in the travel control program.

First, in S10, the target recognition block 110 obtains the target information. Next, in S20, the space recognition block 120 obtains the parking space information. Subsequently, in S30, the behavior determination block 130 determines whether or not there is any parked target vehicle B. When it is determined that there is a parked target vehicle B, it is determined in S40 whether or not the parking complete condition for the target vehicle B is met. When it is determined that the parking complete condition is met, the flow proceeds to S90, which will be described later.

On the other hand, when it is determined at S30 that there is no parked target vehicle B, or when it is determined at S40 that the parking complete condition is not met, the flow proceeds to S50. In S50, the behavior determination block 130 determines whether there is a target vehicle B that may possibly be parked, that is, whether there is a target vehicle B traveling from the far side toward the near side in the travel direction of the host vehicle A. When it is determined that there is no target vehicle B that may possibly be parked, the flow proceeds to S70, which will be described later.

On the other hand, when it is determined that there is a target vehicle B that may be parked, the behavior determination block 130 determines whether or not the target vehicle B is taking a parking-related behavior in S60. When it is determined that the vehicle has not taken the parking-related behavior, the flow proceeds to S70. In S70, the target determination block 140 performs the normal control based on the normal target inter-vehicle distance and the target vehicle speed, and ends this flow.

On the other hand, when it is determined in S60 that the parking-related behavior is taken, the flow proceeds to S80. In S80, the behavior determination block 130 determines whether or not the high-confidence condition is met regarding the parking-related behavior. In other words, the behavior determination block 130 determines whether the parking-related behavior corresponds to the high confidence behavior. When it is determined that the high-confidence condition is met, the target determination block 140 performs the stop control as the admission control in S90. Subsequently, in S100, the notification block 150 notifies the target vehicle B that parking is possible.

On the other hand, when it is determined in S80 that the high-confidence condition is not met, that is, the parking-related behavior corresponds to the low confidence behavior, in S110, the target determination block 140 performs the slowdown control as the admission control.

According to the first embodiment described above, when the parking-related behavior as the move-related behavior of the target vehicle B is detected for the target vehicle B traveling from the far side toward the near side in the travel direction of the host vehicle A, the admission control of the host vehicle A is performed. In the admission control, in order to admit the target vehicle B to move to the parking space Sp, the traveling host vehicle A is stopped in a state in which the admission distance Dt is reserved. Therefore, before the host vehicle A obstructs the move of the target vehicle B to the space, the host vehicle A can stop in a state of pre-admitting the move of the target vehicle B. Therefore, it is no longer necessary to cause the move of the host vehicle A kept in a state of obstructing the move of the target vehicle B, and the risk of approaching the surrounding moving bodies is reducible.

Further, according to the first embodiment, the admission distance Dt is determined based on the margin distance Dm toward the host vehicle A, which is added to the end Ed1 of the entrance En to the parking space Sp on the far side from the target vehicle B. Therefore, the host vehicle A can be stopped in a state in which the entrance En to the parking space Sp is securely kept open. Therefore, the move of the target vehicle B to the parking space Sp is reliably admissible.

Further, according to the first embodiment, the parking-related behavior includes the high confidence behavior and the low confidence behavior in which the probability that move to the parking space Sp is realized is higher than the low confidence behavior. Then, the admission control includes (a) admitting the host vehicle A to travel in a state in which the speed is lowered to be in the admissible speed range when the low confidence behavior is detected, and (b) stopping the traveling host vehicle A in a state in which the admission distance Dt is reserved when the high confidence behavior is detected. Therefore, when the low confidence behavior is detected, the host vehicle A can travel in a state in which the speed is reduced to be within the admissible speed range until a high confidence behavior indicating a higher probability of move is detected. Therefore, when the high confidence behavior is detected, a smooth transition from traveling to stopping can be realized.

In addition, according to the first embodiment, when performing the admission control, it further includes providing notification to the target vehicle B that it is possible to move to the parking space Sp. Therefore, depending on the admission control of the host vehicle A, the move of the target vehicle B to the parking space Sp may possibly be assisted by the notification.

Further, according to the first embodiment, stop of the host vehicle A in a state of reserving the admission distance Dt is continued until the parking complete condition is met for admitting the move of the target vehicle B to the parking space Sp. Therefore, obstructing the parking of the target vehicle B is avoidable until the move of the target vehicle B to the parking space Sp is complete.

Second Embodiment

As shown in the drawing, the second embodiment is a modification of the first embodiment.

In the second embodiment, the target recognition block 110 obtains target information about the target vehicle B as a work moving body. The work moving body includes, for example, at least one or more of forklifts, tractors, and crane trucks.

The space recognition block 120 also obtains work space information regarding a work space Sw around the host vehicle A. The space recognition block 120 may obtain work space information included in map data stored in the map DB 30. Alternatively, the space recognition block 120 may obtain the work space information included in the outside information from the outside sensor 11. Alternatively, the space recognition block 120 may obtain the work space information included in the communication information from the V2X type communication system 20. The work space Sw is an example of the "space."

Based on the target information and the work space information, the behavior determination block 130 determines whether or not the target vehicle B is taking the work-related behavior related to a move to the work space Sw. The behavior determination block 130 determines the work-related behavior when, for example, the distance between the target vehicle B and the work space Sw is within a work distance range and the vehicle speed of the target vehicle B is within a work speed range. The working distance range is a range in which the distance between the target vehicle B and the work space Sw is (a) equal to or less than a distance threshold or (b) less than the distance threshold. Further, the work speed range is a range in which the vehicle speed of the target vehicle B is (a) equal to or less than a vehicle speed threshold or (b) less than the vehicle speed threshold.

Further, work-related behavior includes the high confidence behavior and the low confidence behavior, just like the parking-related behavior. The high confidence behavior is a behavior in which the probability that move to the work space Sw is realized is higher than the low confidence behavior. The low confidence behavior is a behavior in which the probability that move to the work space Sw is realized is lower than the high confidence behavior. The behavior determination block 130 further determines whether the work-related behavior taken by the target vehicle B of determination corresponds to the high confidence behavior or the low confidence behavior. For example, the behavior determination block 130 determines that the work-related behavior corresponds to the high confidence behavior when the high-confidence condition is met, and determines that the work-related behavior corresponds to the low confidence behavior when the high-confidence condition is not met. A specific example of the high-confidence condition is substantially the same as in the first embodiment. Note that the "parking space Sp" in the detailed conditions of the high-confidence conditions in the first embodiment is replaced with the "work space Sw" in the second embodiment.

The work-related behavior described above is an example of the move-related behavior related to move of the host vehicle A to a space connected to the travel path.

In addition, the behavior determination block 130 determines whether or not the target vehicle B that has reached the work space Sw satisfies a move complete condition that the move is complete. For example, the move complete condition includes that the time (work time) during which the target vehicle B remains in the work space Sw reaches a completion time range. The completion time range is a time range in which the work time is (a) equal to or greater than a threshold time, or (b) greater than the threshold time. Alternatively, the move complete condition may include that an elapsed time from passing of the target vehicle B through the entrance En to the work space Sw reaches the completion time range. Note that the move complete condition may be defined to be met when the stop time of the target vehicle B in the work space Sw reaches the completion time range.

The target determination block 140 determines the target behavior of the host vehicle A based on the determination result regarding the work-related behavior by the behavior determination block 130. The target determination block 140 determines that travel of the host vehicle A is performed at the normal target inter-vehicle distance and at the target speed when it is determined that the target vehicle B is not taking any work-related behavior.

On the other hand, when it is determined that the target vehicle B is taking the work-related behavior, the target determination block 140 performs the admission control of the host vehicle A to admit the move of the target vehicle B to the work space Sw. The target determination block 140 performs the different admission control depending on whether the work-related behavior corresponds to the low confidence behavior or the high confidence behavior.

More specifically, when the work-related behavior is determined to be the low confidence behavior, the target determination block 140 performs the slowdown control that causes the host vehicle A to travel while reducing the speed down to the admissible speed range. The admissible speed range is a speed range that is (a) less than the admissible speed threshold or (b) equal to or less than the admissible speed threshold. For example, the admissible speed range is set to a range of a speed at which at least a specified amount of time can be reserved from the current time before the distance to the target vehicle B reaching the admission distance Dt. The specified amount of time is a preset amount of time. For example, when the target vehicle B is in the same direction lane, the specified amount of time may be set as the time from when the vehicle stops to when it starts to reversely move to the work space Sw.

The target determination block 140 continues the above-described slowdown control until the high confidence behavior is established for the target vehicle B or until the work-related behavior is interrupted.

Figure 5:
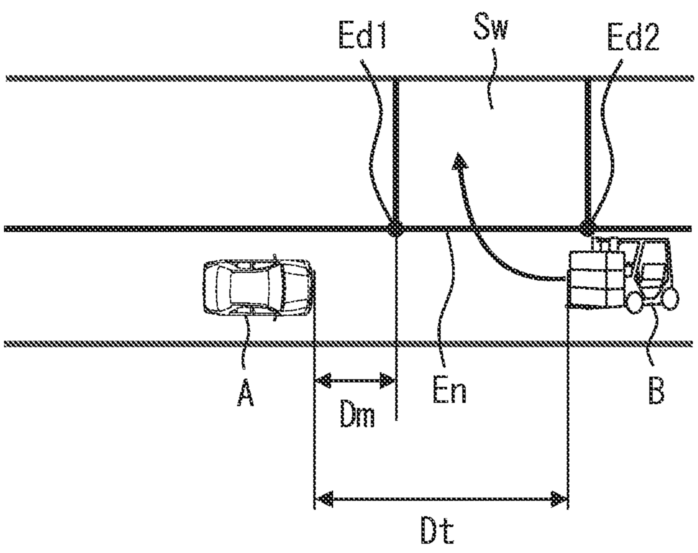
FIG. 5 is a schematic diagram of a travel environment of the host vehicle to which a second embodiment is applied.

Then, when it is determined that the work-related behavior corresponds to the high confidence behavior, the target determination block 140 performs the stop control to stop the traveling host vehicle A in a state in which the admission distance Dt is reserved for admitting the move of the target vehicle B to the work space Sw. For example, as shown in FIG. 5, the admission distance Dt is determined based on the margin distance Dm added from the end Ed1 on the far side of the entrance En to the work space Sw regarding the target vehicle B toward the host vehicle A.

Note that the margin distance Dm may be changed according to the shape and position of the work space Sw, the size of the entrance En, and the like. For example, the margin distance Dm may be increased as the difficulty of move to the work space Sw is estimated to be higher based on the above-described parameters.

The target determination block 140 continues the stop control described above until the move complete condition for the target vehicle B is met. The target determination block 140 may resume a normal control when the move complete condition is met and there is no other target vehicle B taking the work-related behavior. Alternatively, the target determination block 140 may resume the normal control regarding the target vehicle B for which the move complete condition is not met, if the work-related behavior is interrupted due to, for example, leave the work space Sw.

The notification block 150 notifies the target vehicle B that it is possible to move to the work space Sw when performing the stop control corresponding to the target vehicle B taking the high confidence behavior. The notification block 150 may provide the notification via the V2X type communication system 20. In the target vehicle B that has obtained the notification via the communication system 20, it is only necessary to present to the occupant that it is possible to move to the work space Sw through the in-vehicle presentation type information presentation system. Alternatively, if the target vehicle B that has obtained the notification via the communication system 20 is an automatic driving vehicle, a vehicle control for the move to the work space Sw may be admitted based on the notification. Alternatively, the notification block 150 may provide the notification via the outside of vehicle presentation type information presentation system 40.

A travel control flow of the second embodiment will be described below with reference to FIG. 6. This processing flow is repeatedly performed while the host vehicle A is activated. Note that "S" in this processing flow means each of multiple steps performed by multiple instructions included in the travel control program. Regarding the flow of FIG. 6, the steps with the same reference numerals as those of the flow of FIG. 4 in the first embodiment are substantially the same processes, and the description of the first embodiment is used.

In S21 following S10, the space recognition block 120 obtains the work space information. Subsequently in S31, the behavior determination block 130 determines the presence or absence of the target vehicle B in the work space Sw. When it is determined that the target vehicle B is present in the work space Sw, it is determined in S41 whether or not the move complete condition for completing the move of the target vehicle B to the work space Sw has been met. When it is determined that the move complete condition is met, the flow proceeds to S90.

On the other hand, when it is determined in S31 that there is no target vehicle B in the work space Sw, or when it is determined in S41 that the move complete condition is not met, the flow proceeds to S51. In S51, the behavior determination block 130 determines whether or not there is the target vehicle B (i.e., the work moving body) traveling from the far side toward the near side in the travel direction of the host vehicle A. When it is determined that there is no target vehicle B, which is a work moving body, the flow proceeds to S70.

On the other hand, when it is determined that there is a target vehicle B, which is a work moving body, the behavior determination block 130 determines in S61 whether or not the target vehicle B is taking a work-related behavior. When it is determined that the work-related behavior is not taken, the flow proceeds to S70.

On the other hand, when it is determined in S61 that the work-related behavior is taken, the flow proceeds to S81. In S81, the behavior determination block 130 determines whether or not the high-confidence condition is met for the work-related behavior. When it is determined that the high-confidence condition is met, the flow proceeds to S90. Subsequently in S101, the notification block 150 notifies the target vehicle B that it can move to the work space Sw.

On the other hand, when it is determined in S81 that the high-confidence condition is not met, that is, the work-related behavior corresponds to the low confidence behavior, the flow proceeds to S110.

Other Embodiments

Although multiple embodiments have been described above, the present disclosure is not construed as being limited to those embodiments, and can be applied to various embodiments and combinations within a scope that does not depart from the spirit of the present disclosure.

In a modification example, the travel control system 100 may detect both of the parking-related behavior and the work-related behavior as the move-related behavior.

In a modification example, at least one of the host vehicle A and the target vehicle B may be a moving body other than a vehicle. For example, at least one of host vehicle A and target vehicle B may be a logistics robot.

In a modification example, when (i) the host vehicle A cannot be stopped in a state in which the admission distance Dt is reserved and (ii) the host vehicle A is admitted to travel in the opposite direction, the travel control system 100 causes the host vehicle A to travel in the opposite direction, for reserving the admission distance Dt.

In a modification example, the travel control system 100 may determine whether or not the target vehicle B is taking the parking-related behavior based on a learned model that has been learned to output whether or not the parking-related behavior is performed in response to an input of the target information. Further, the travel control system 100 may determine whether or not the target vehicle B is taking the work-related behavior based on a learned model that has been learned to output whether or not the work-related behavior is performed in response to an input of the target information.

In a modification example, the travel control system 100 may perform the notification by the notification block 150 even when the low confidence behavior is detected, in the same manner as when the high confidence behavior is detected.

In a modification example, the dedicated computer that configures the travel control system 100 may have at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may have a memory in which programs are stored.

In addition to the embodiments described so far, the travel control system 100 according to the above-described embodiments and modifications may be implemented as a travel control device that is a processing device (for example, a processing ECU, etc.) mounted on the host vehicle A. Also, the above-described embodiments and modifications may be implemented as a semiconductor device (for example, a semiconductor chip or the like) having at least one processor 102 and at least one memory 101 of the travel control system 100.

What is claimed is:

1. A travel control system controlling travel of a host moving body, the travel control system comprising a processor configured to:

detect a move-related behavior indicating a move of a target moving body to a space connected to a travel path of the host moving body, the target moving body traveling from a far side toward a near side in a travel direction of the host moving body; and perform, when detecting the move-related behavior, an admission control to admit the move of the target moving body to the space, wherein the admission control includes stopping the host moving body, which is in a traveling state, with an admission distance being reserved for admitting the move of the target moving body to the space, the move-related behavior includes a high confidence behavior and a low confidence behavior, the high confidence behavior has a higher probability of performing the move to the space than that of the low confidence behavior, and the admission control includes:

slowing the host moving body within an admission speed range when the low confidence behavior is detected; and stopping the host moving body, which is in the traveling state, with the admission distance being reserved when the high confidence behavior is detected.

2. The travel control system according to claim 1, wherein the admission distance is determined based on a margin distance, which is added to an end of an entrance of the space on a far side from the target moving body toward the host moving body.

3. The travel control system according to claim 1, wherein, in the admission control, notification is provided to the target moving body notifying that it is possible to move to the space.

4. The travel control system according to claim 1, wherein detecting the move-related behavior further includes determining whether a move complete condition is met regarding the target moving body that has reached the space, and performing the admission control includes continuing a stop state of the host moving body with the admission distance being reserved until the move complete condition is determined to be met.

5. The travel control system according to claim 1, wherein the space includes a parking space, and the move-related behavior includes a parking-related behavior related to parking in the parking space.

6. The travel control system according to claim 1, wherein the space includes a work space in which a work moving body works, and the move-related behavior includes a work-related behavior related to move of the work moving body serving as the target moving body to the work space.

7. A travel control device controlling travel of a host moving body, the travel control device comprising a processor configured to:

detect a move-related behavior indicating a move of a target moving body to a space connected to a travel path of the host moving body, the target moving body traveling from a far side toward a near side in a travel direction of the host moving body; and perform, when detecting the move-related behavior, an admission control to admit the move of the target moving body to the space, wherein the admission control includes stopping the host moving body, which is in a traveling state, with an admission distance being reserved for admitting the move of the target moving body to the space, the move-related behavior includes a high confidence behavior and a low confidence behavior, the high confidence behavior has a higher probability of performing the move to the space than that of the low confidence behavior, and the admission control includes:

slowing the host moving body within an admission speed range when the low confidence behavior is detected; and stopping the host moving body, which is in the traveling state, with the admission distance being reserved when the high confidence behavior is detected.

8. A travel control method performed by a processor for controlling travel of a host moving body, the travel control method comprising:

detecting a move-related behavior indicating a move of a target moving body to a space connected to a travel path of the host moving body, the target moving body traveling from a far side toward a near side in a travel direction of the host moving body; and performing, when detecting the move-related behavior, an admission control to admit the move of the target moving body to the space, wherein the admission control includes stopping the host moving body, which is in a traveling state, with an admission distance being reserved for admitting the move of the target moving body to the space, the move-related behavior includes a high confidence behavior and a low confidence behavior, the high confidence behavior has a higher probability of performing the move to the space than that of the low confidence behavior, and the admission control includes:

slowing the host moving body within an admission speed range when the low confidence behavior is detected; and stopping the host moving body, which is in the traveling state, with the admission distance being reserved when the high confidence behavior is detected.

9. A non-transitory, tangible storage medium storing a travel control program including instructions to be executed by a processor for causing a computer to control travel of a host moving body, the instructions comprising:

causing detection of a move-related behavior indicating a move of a target moving body to a space connected to a travel path of the host moving body, the target moving body traveling from a far side toward a near side in a travel direction of the host moving body; and causing, when detecting the move-related behavior, execution of an admission control to admit the move of the target moving body to the space, wherein the admission control includes stopping the host moving body, which is in a traveling state, with an admission distance being reserved for admitting move of the target moving body to the space, the move-related behavior includes a high confidence behavior and a low confidence behavior, the high confidence behavior has a higher probability of performing the move to the space than that of the low confidence behavior, and the admission control includes:

slowing the host moving body within an admission speed range when the low confidence behavior is detected; and stopping the host moving body, which is in the traveling state, with the admission distance being reserved when the high confidence behavior is detected.

* * * * *